United States Patent [19]
Gibbs

[11] Patent Number: 5,842,671
[45] Date of Patent: Dec. 1, 1998

[54] SECURED RECEPTACLE HOLDER

[76] Inventor: Dorian Gibbs, 5253 San Vicente Blvd., Los Angeles, Calif. 90019

[21] Appl. No.: 745,371

[22] Filed: Nov. 8, 1996

[51] Int. Cl.[6] ........................................ E04G 5/06
[52] U.S. Cl. .................... 248/231.41; 248/311.2
[58] Field of Search ............... 248/231.41, 230.3, 248/228.3, 229.22, 229.12, 311.2

[56] References Cited

U.S. PATENT DOCUMENTS

| | | | |
|---|---|---|---|
| D. 162,959 | 4/1951 | Janes et al. | D58/26 |
| D. 226,623 | 4/1973 | Shuford | D44/21 A |
| D. 267,625 | 1/1983 | Dark | D8/73 |
| 1,550,588 | 8/1925 | Soldani . | |
| 2,532,244 | 11/1950 | Pasmore | 220/51 |
| 3,021,106 | 2/1962 | Kramer | 248/311.2 |
| 3,036,717 | 5/1962 | Johnson | 211/88 |
| 3,239,181 | 3/1966 | Ellerbrock | 248/210 |
| 3,317,171 | 5/1967 | Kramer | 248/311.2 |
| 3,734,439 | 5/1973 | Wintz | 248/311.2 |
| 4,903,929 | 2/1990 | Hoffman | 248/229 |
| 4,993,675 | 2/1991 | Walker | 348/311.2 |
| 5,106,046 | 4/1992 | Rowles et al. | 248/311.2 |
| 5,190,257 | 3/1993 | Gradel et al. | 248/231.7 |
| 5,320,263 | 6/1994 | Kobylack | 248/311.2 |
| 5,454,537 | 10/1995 | Meeker et al. | 248/220.1 |

Primary Examiner—Ramon O. Ramirez
Assistant Examiner—Willie Berry, Jr.
Attorney, Agent, or Firm—Knobbe, Martens, Olson & Bear LLP

[57] ABSTRACT

A secured receptacle holder having two securing posts each with a clamping member and rib configuration. The posts are connected by a clamping screw that rotates clockwise to attach and counter clockwise to detach by a compression knob. Continued rotation clockwise causes the lower post to telescope into the main post while driving the clamping members toward one another. On other types of surfaces support is achieved by a pedestal base. The main post top has a smaller diameter with a securing cap inserted into its top which keeps the support rotator in place. The support rotator has a thread stabilizer housing containing a thread insert stabilizer. Threaded into the thread insert stabilizer is a support lock that rotates clockwise to lock and counter clockwise to unlock. Sandwiched between the thread stabilizer housing and the support lock is a holder for a receptacle. The support lock allows the holder to remain level even on inclined surfaces. The holder has two oppositely curved arms used to partially surround a receptacle. A space exists between the arms to accommodate a handle or other protruding element. The holder also has a base support with a lip. The base support surface has a raiser used to keep a receptacle above the outward portion of the base support creating a concave between the raiser and the lip. This allows moisture or "sweating" of the receptacle to fall downward into the concave and away from the receptacle.

34 Claims, 10 Drawing Sheets

SECURED RECEPTACLE HOLDER

BACKGROUND—FIELD OF INVENTION

This invention relates generally to a receptacle holder, and more particularly to a removable holder that can be securely mounted and adjusted on a multitude of surface types or members.

BACKGROUND—DESCRIPTION OF PRIOR ART

In the prior art, several holders have been made available for supporting a beverage container when a person drinking from the container puts the container down to perform another activity. Originally holders were made to be hung over the edge of a car window. This ment that the holder was dependent on the window being opened. This problem has been partially solved by other inventions where mounting is on the interior side of a vehicle door, but these had and still have significant problems. The mug holder in U.S. Pat. No. 5,106,046 to Rowles, 1992 Apr. 21, can still be disturbed by the movement of a car window and lacks a secure mounting feature making it easy for it to be knocked off a vehicle door if bumped against. Limitations also include only being able to mount to the interior of a car door and the inability to support different sizes and weights of containers due to weak materials; nor does it have a feature that would prevent dripping or "sweating" from a container to the surface below. Where the cup holder in U.S. Pat. No. 5,454,537 to Meeker, 1995 Oct. 3, does add a feature which prevents dripping onto another surface, it is still limited to mounting onto a particular type of surface. It also uses a large amount of space and material and, similar to the Rowles patent, the cup or mug position cannot be adjusted once mounted onto a surface. The container holder in U.S. Pat. No. 5,190,257 to Gradei, 1993 Mar. 2, helps to solve the problem of mounting to a moving object that the previous referenced patents had not addressed. But its mounting feature is still limited to mounting to a certain type of surface, while also adding the possibility of damaging the mounted surface.

OBJECTS AND ADVANTAGES

Accordingly several objects and advantages of my invention are; the ability to mount to a multitude of different surface types for use in several environments, the ability to have a holder securely mounted which avoids being easily knocked over, the ability to protect surfaces from being damaged from mounting, the improved ability to protect underlying surfaces from moisture due to dripping or "sweating", a compact design whereby the amount of space used is minimal, improved methods and results for adjusting a holder on moving or sloped objects or surfaces, and improved materials allowing support of containers of different weight, size and shape such as cups, cans, bottles, spray cans, etc.

Other objects and advantages are:

(a) to provide a method of securing a holder on surfaces of varying widths;

(b) to provide a method of securing a holder in an inverted position while maintaining a receptacle in a level position;

(c) to provide a holder that can be clamped to a surface of any inclination;

(d) to provide a holder that rotates 360° degrees so as to align or face the holder in a multitude of directions or positions;

(e) to provide a holder that is easy to assemble and disassemble;

(f) to provide a holder that is durable and attractive for use in a multitude of environments including home and office;

Further objects and advantages are to provide a receptacle holder that can be manufactured with a variety of interchangeable colored parts using injection molding or other means to obtain a strong and durable structure, to make replacement of damaged parts easy, can embody multiple holders, and which can use a variety of clamping configurations. Still further objects, features, and advantages of my invention will become apparent from a consideration of the ensuing description and drawings.

DRAWING FIGURES

Figure 1:
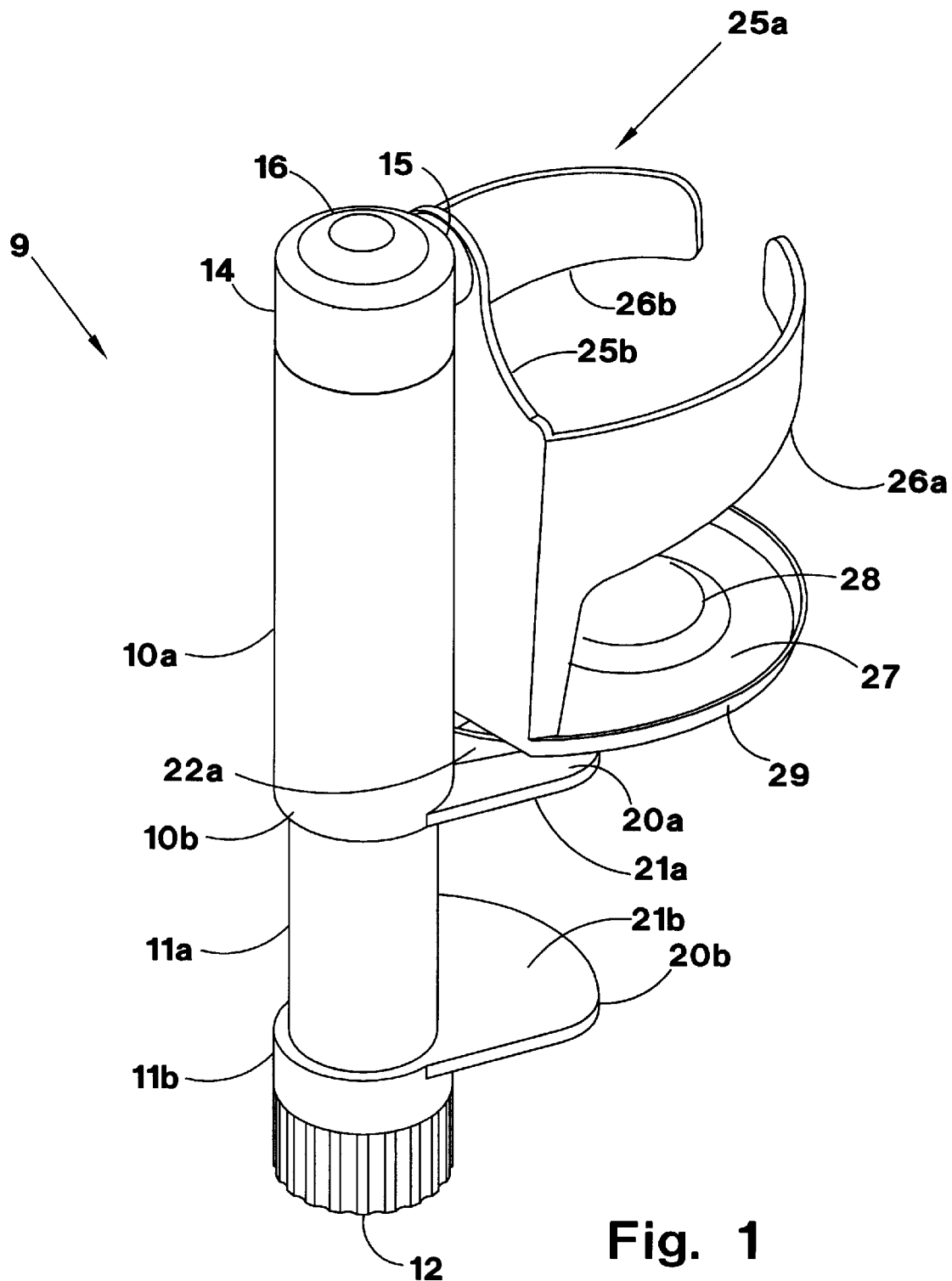
FIG. 1 shows a perspective view of the fully assembled and fully extended product with the holder aligned with the clamping members.

| REFERENCE NUMERALS IN DRAWING | |
|---|---|
| 9 | secured receptacle holder |
| 10a | main securing post |
| 10b | main post bottom |
| 10c | main post top |
| 11a | lower securing post |
| 11b | lower post bottom |
| 12 | clamping compression knob |
| 13 | structural connection |
| 14 | receptacle support rotator |
| 15 | thread stabilizer housing |
| 16 | securing cap |
| 17a | main disk thread support |
| 17b | lower disk thread support |
| 18a | main clamping thread insert |
| 18b | lower clamping thread insert |
| 19 | clamping screw |
| 20a | main clamping member |

-continued

REFERENCE NUMERALS IN DRAWING

| | |
|---|---|
| 20b | lower clamping member |
| 21a | main direct contact surface |
| 21b | lower direct contact surface |
| 22a | main rib configuration |
| 22b | lower rib configuration |
| 23 | thread insert stabilizer |
| 24 | receptacle support lock |
| 25a | holder |
| 25b | holder leg |
| 25c | holder support hole |
| 26a | left holder arm |
| 26b | right holder arm |
| 27 | base support |
| 28 | raiser |
| 29 | base lip |
| 30 | locking groove |
| 31 | pedestal base |
| 32 | inclined surface |
| 33 | surface |

SUMMARY

This invention is one that contains at least one holder which can be securely clamped onto a surface of any inclination. The holder can rotate 360° degrees around its longitudinal axis and 360° degrees around a pivot point allowing holder to face in any direction. Thus the secured receptacle holder is a highly reliable, easy to use, yet economical device that can be used by persons of almost any age and in a home or work area of almost any profession.

DESCRIPTION OF THE PREFERRED EMBODIMENTS

One typical embodiment of a secured receptacle holder 9 is illustrated in FIGS. 1 to 4. The secured receptacle holder 9 is made by molding, injection molding or other means for creating a strong and durable structure. The secured receptacle holder 9 has a main securing post 10a and a lower securing post 11a, both of which are hollow. The lower post 1a has a diameter smaller than that of the main post 10a thus allowing the lower post 11a to enter or telescope into the main post 10a.

The main post 10a contains a main disk thread support 17a; and the thread support 17a contains a main clamping thread insert 18a. Likewise the lower post 11a contains a lower disk thread support 17b; and the thread support 17b contains a lower clamping thread insert 18b as seen in a cross section of the invention in FIG. 3.

The main post 10a has a main post bottom 10b. Connected to the main post bottom is a main clamping member 20a; and connected to both the main post bottom 10b and the main clamping member 20a is a main rib configuration 22a for added strength. Likewise connected to the lower post 11a is a lower post bottom 11b. And connected to the lower post bottom 11b is a lower clamping member 20b; and connected to both the lower post bottom 11b and the clamping member 20b is a lower rib configuration 22b for added strength.

Figure 2:
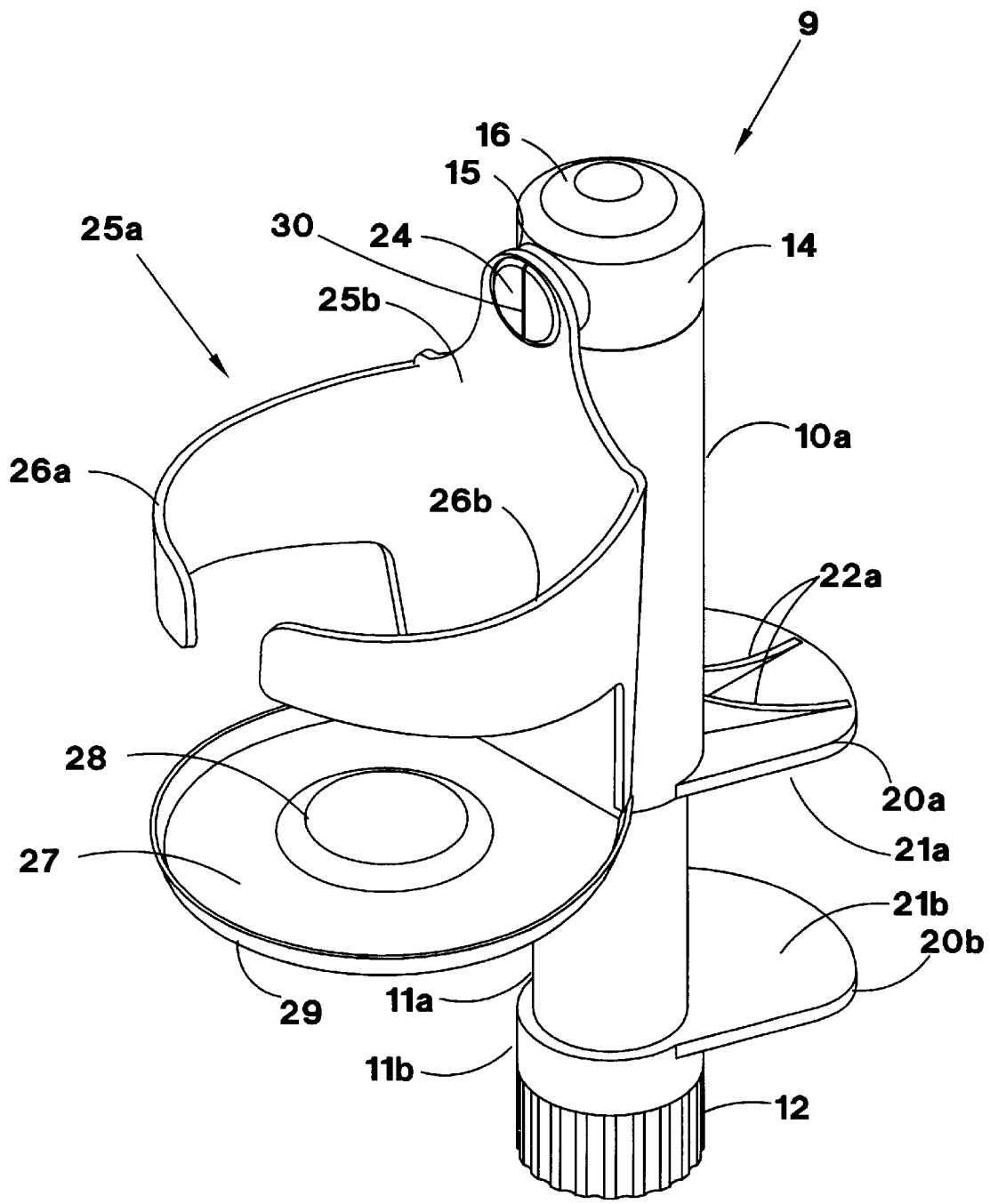
FIG. 2 shows a perspective view of the product with the holder on the opposite side of the clamping members after a 180 degree rotation around the center pivot point of the product.

The main clamping member 20a has a main direct contact surface 21a. Likewise the lower clamping member 20b has a lower direct contact surface 21b as shown in FIGS. 1 and 2. The contact surfaces 21a and 21b are made slip-resistant by molding, rubber pads or other means.

Figure 3:
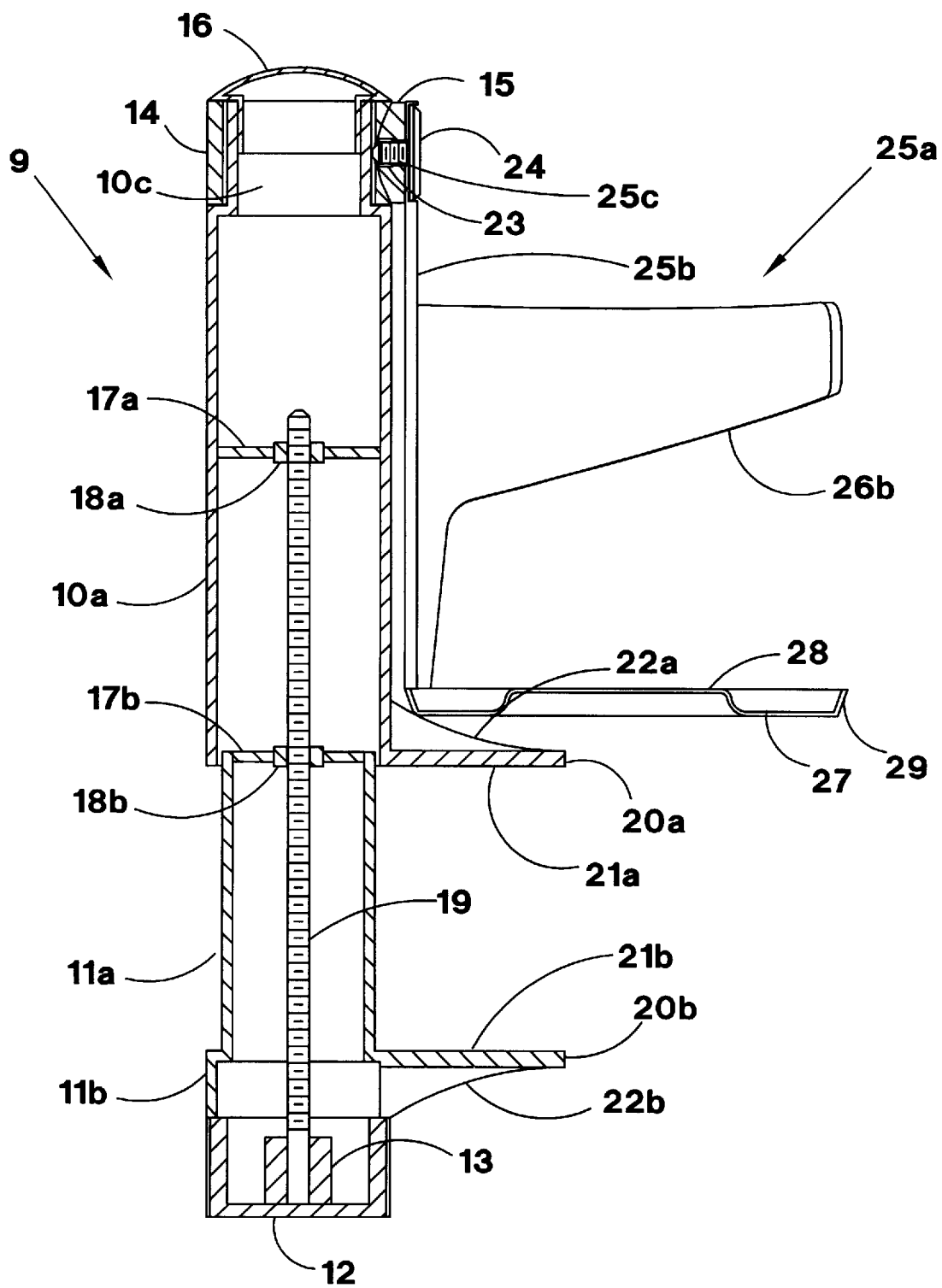
FIG. 3 shows a cross section of the entire product in a fully assembled and fully extended position allowing viewing of the interior components.
Figure 4:
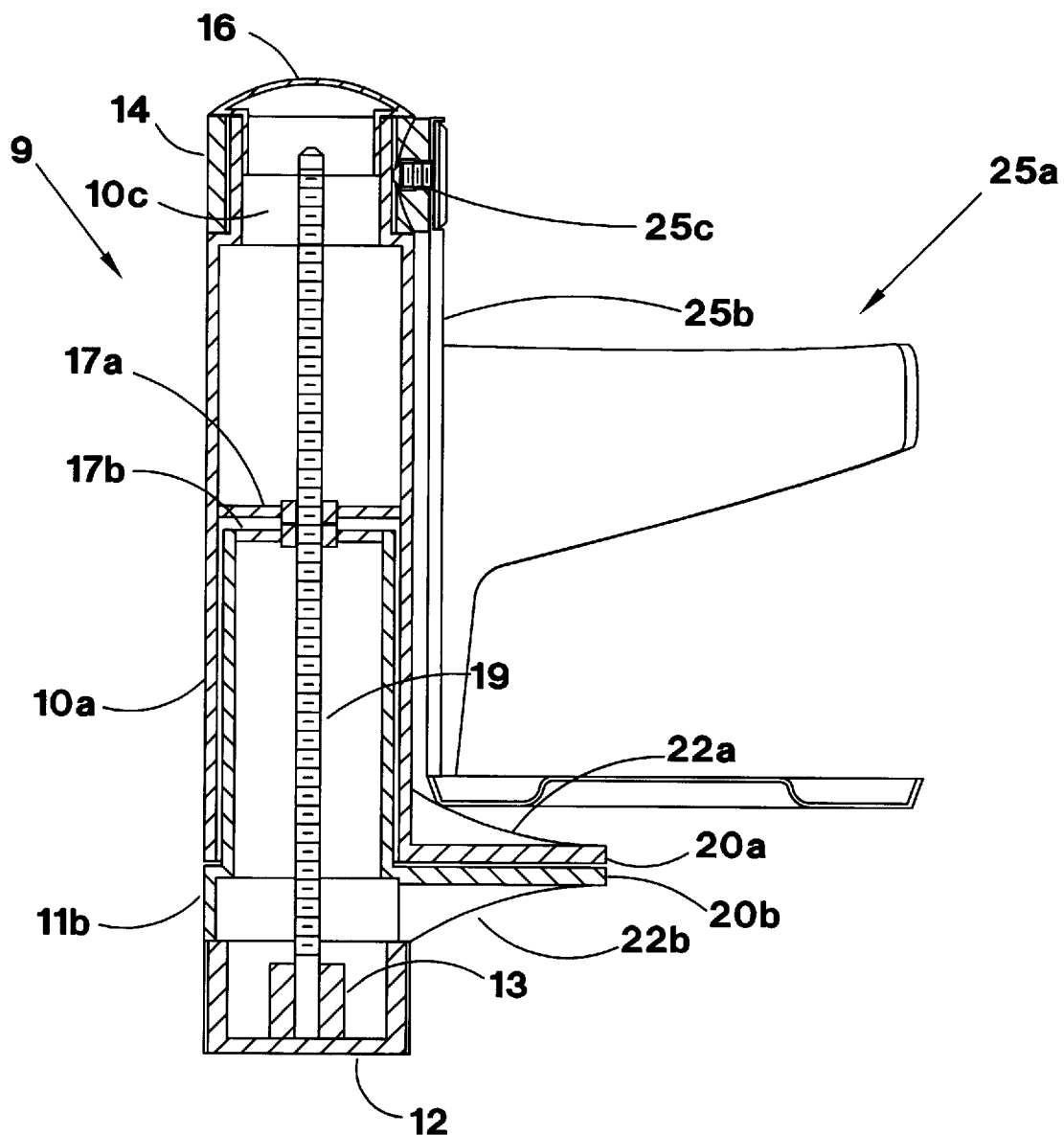
FIG. 4 shows a cross section of the entire product in a fully assembled and fully clamped position allowing viewing of the interior components.

As shown in FIG. 3 the main post 10a and the lower post 11a are attached together by a clamping screw 19 which is connected to the center of a structural connection 13; and the structural connection 13 is connected to the center of a clamping compression knob 12. Turning the compression knob 12 clockwise causes the clamping screw 19 to thread upwardly through the thread inserts 18a and 18b. This same turning of the compression knob 12 causes the clamping members 20a and 20b to be driven toward one another as indicated by FIG. 4 allowing the secured receptacle holder 9 to be securely mounted onto a table, desk, shelf, pole or other surface. Turning the compression knob 12 counter clockwise causes the clamping members 20a and 20b to be driven apart thus detaching from surface.

The main post 10a has a main post top 10c which is smaller in diameter than the main post 10a as shown in FIG. 3. The main post top 10c is about one inch in length from the top. A receptacle support rotator 14 surrounds this. The support rotator 14 is held in position around the smaller diameter of the main post top 10c by a securing cap 16 which is glued, threaded, or attached by other means to securely fit inside the top of the main post top 10c. Attached by molding or other means to the support rotator 14 is a thread stabilizer housing 15 which has a thread insert stabilizer 23 in its center. Screwed into the thread insert stabilizer 23 is a receptacle support lock 24. The support lock 24 contains a locking groove 30 as shown in FIG. 2. The support lock 24 is long enough to screw through the width of the stabilizer housing 15 until it touches the smaller diameter of the main post top 10c thus locking the support rotator 14 in place.

Sandwiched between the support lock 24 and the thread stabilizer 15 is a holder 25a as shown in FIGS. 3 and 4. The holder 25a has a holder leg 25b which has a holder support hole 25c at its top. The holder 25a also has two oppositely curved arms, a left holder arm 26a and a right holder arm 26b. At the bottom of the holder 25a is a base support 27 that has a base lip 29 surrounding it. Attached by molding or other means to the top of the base support 27 is a raiser 28 which is smaller in diameter and slightly raised to allow for a nominal amount of space to exist between a receptacle and the base support 27.

Figure 6:
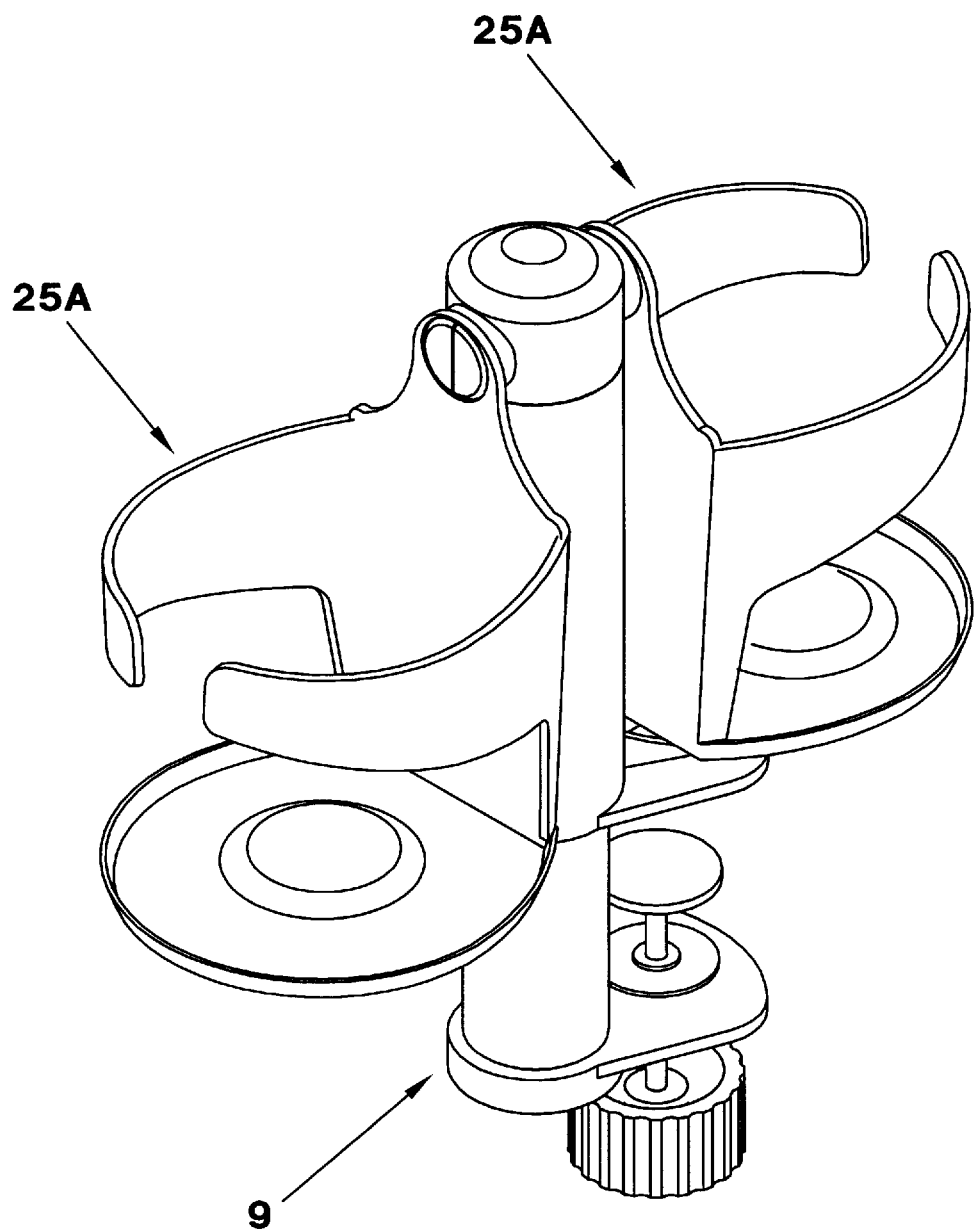
FIG. 6 shows a perspective view of the fully assembled and fully extended product with multiple holders and a modification of the clamping members.
Figure 7:
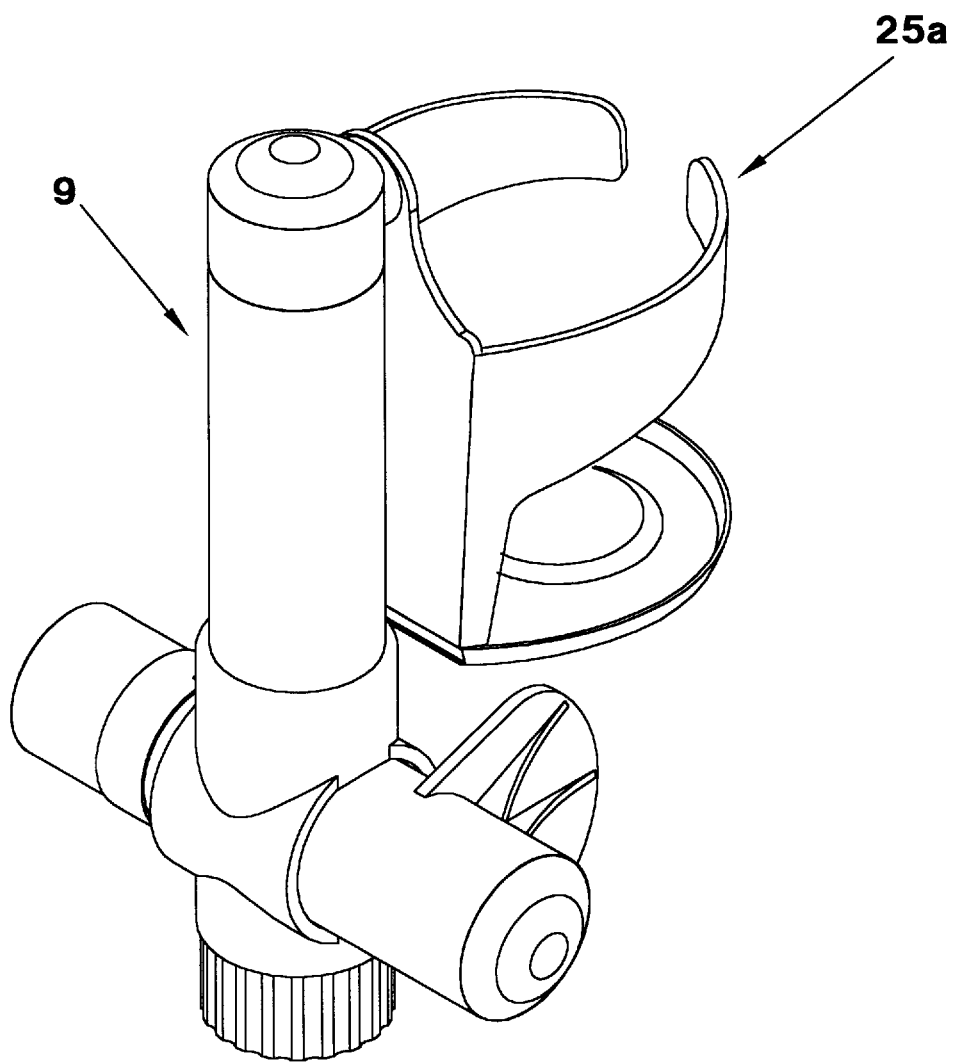
FIG. 7 shows a perspective view of the fully assembled and fully extended product with a perpendicular modification of the clamping members.
Figure 8:
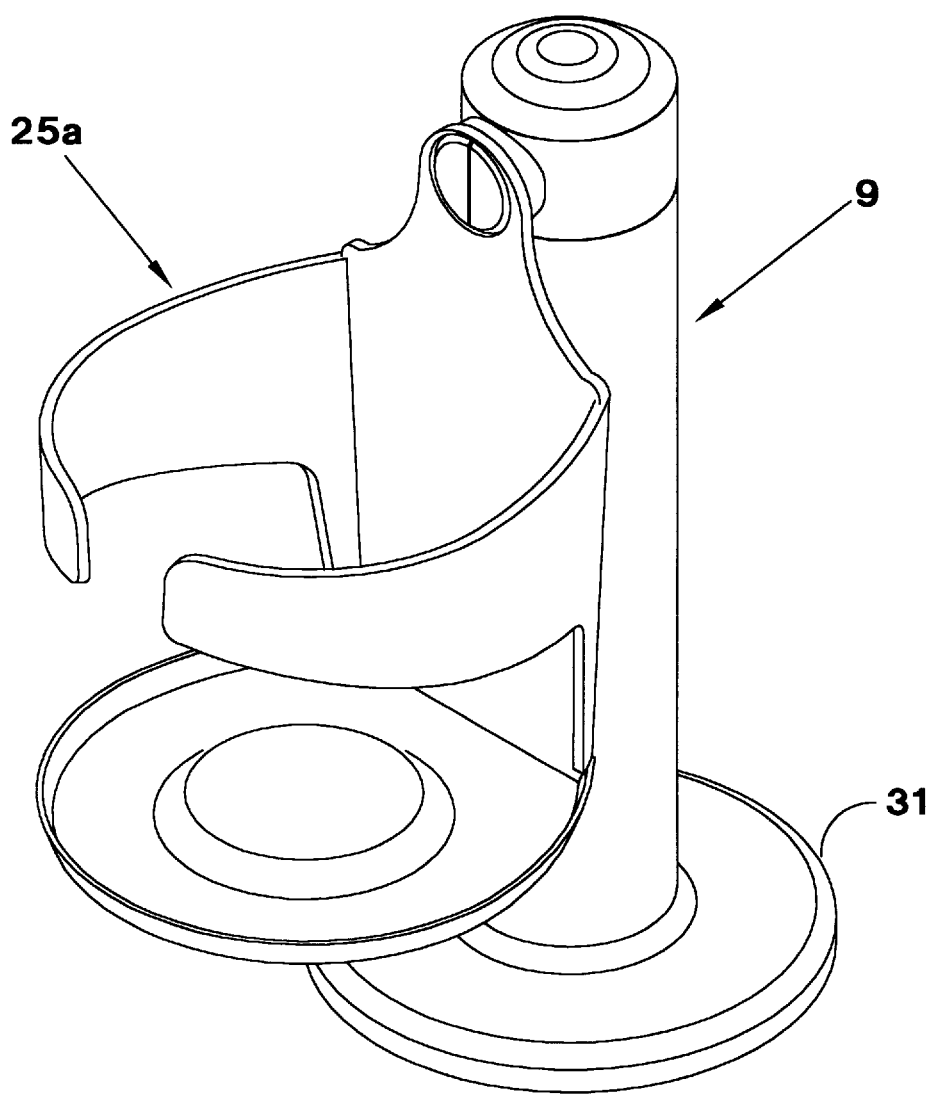
FIG. 8 shows a perspective view of the product with a pedestal base.

Additional embodiments are shown in FIGS. 6, 7 and 8. The holder 25a in FIG. 6 is multiplied in number allowing for an additional receptacle to be supported. The holder 25a can be multiplied without limit by merely increasing the diameter or altering the design of the main post 10a. The clamping members 20a and 20b are also shown to have a different embodiment whereby clamping is achieve by a screw with a means at its top for helping to stabilize said secured receptacle holder 9 as it applies pressure directly onto a surface, much like a standard C-clamp.

Another embodiment as shown in FIG. 7 is where the clamping members 20a and 20b feature a perpendicular embodiment to improve the clamping capability to a vertical post, or the like. Curving of the clamping members or curved material used as the direct contact surface (not shown), similar to that of the holder arms 26a and 26b would also aid in attaching the secured receptacle holder 9 to a post.

And yet another embodiment as shown in FIG. 8 is where the clamping members 20a and 20b are replaced by a pedestal base 31 which has a protective under surface on its bottom. The pedestal 31 is either made using materials which give enough weight to stabilize the secured receptacle holder 9 on a flat surface, or a magnetized or suction type feature allowing for stability on a sloped surface.

OPERATION

The manner of using my secured receptacle holder 9 is clear and simple. First attach the main post 10a and the lower post 11a, which is smaller in diameter, by threading the clamping screw 19 through the thread inserts 18a and 18b. This is achieved when the compression knob 12 is turned clockwise, thus causing the structural connection 13 to rotate, which in turn causes the clamping screw 19 to thread through both of the thread inserts 18b and 18a while also causing the lower post 11a to telescope into the main post 10a. The thread insert 18b is held in place by the disk thread support 17b, while the thread insert 18a is held in place by the disk thread support 17a.

Figure 5A:
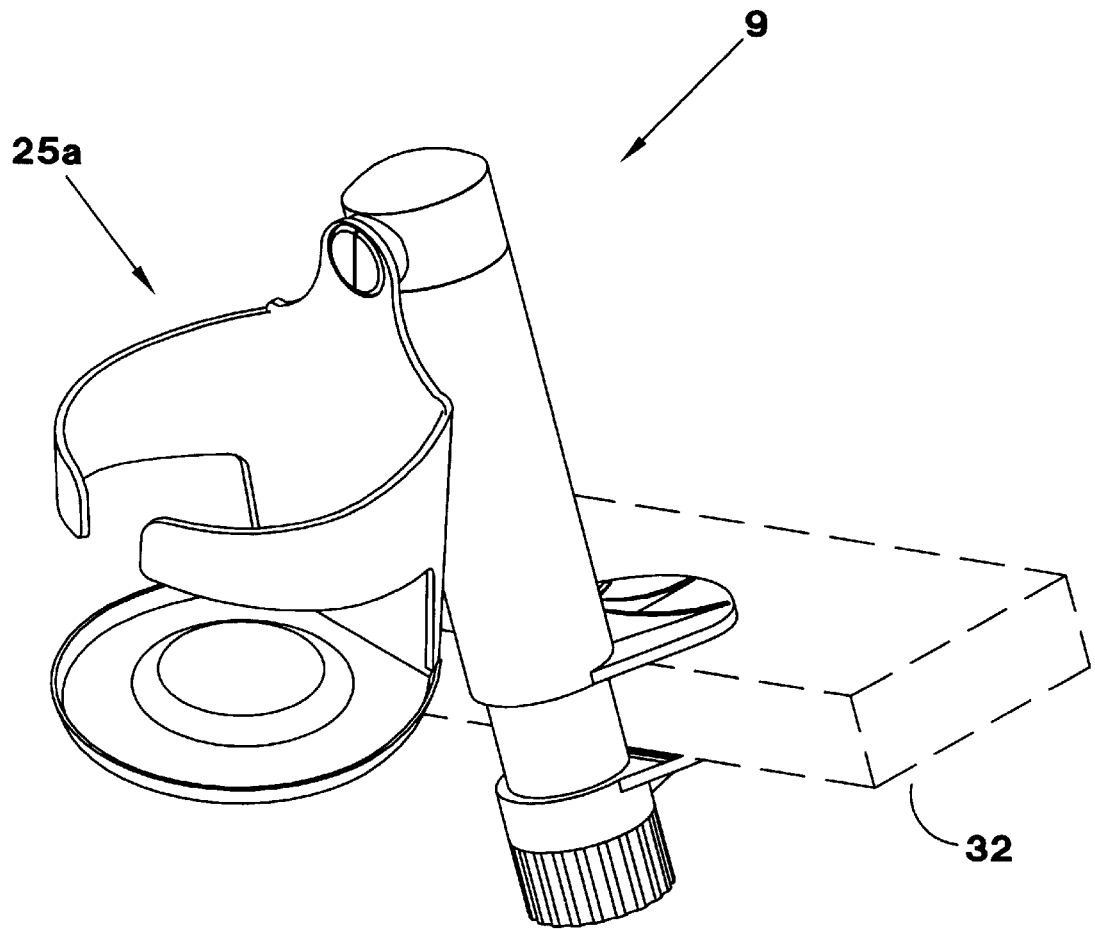
FIG. 5a shows a perspective view of the product clamped on a surface of average thickness with a slight slope or inclination.
Figure 5B:
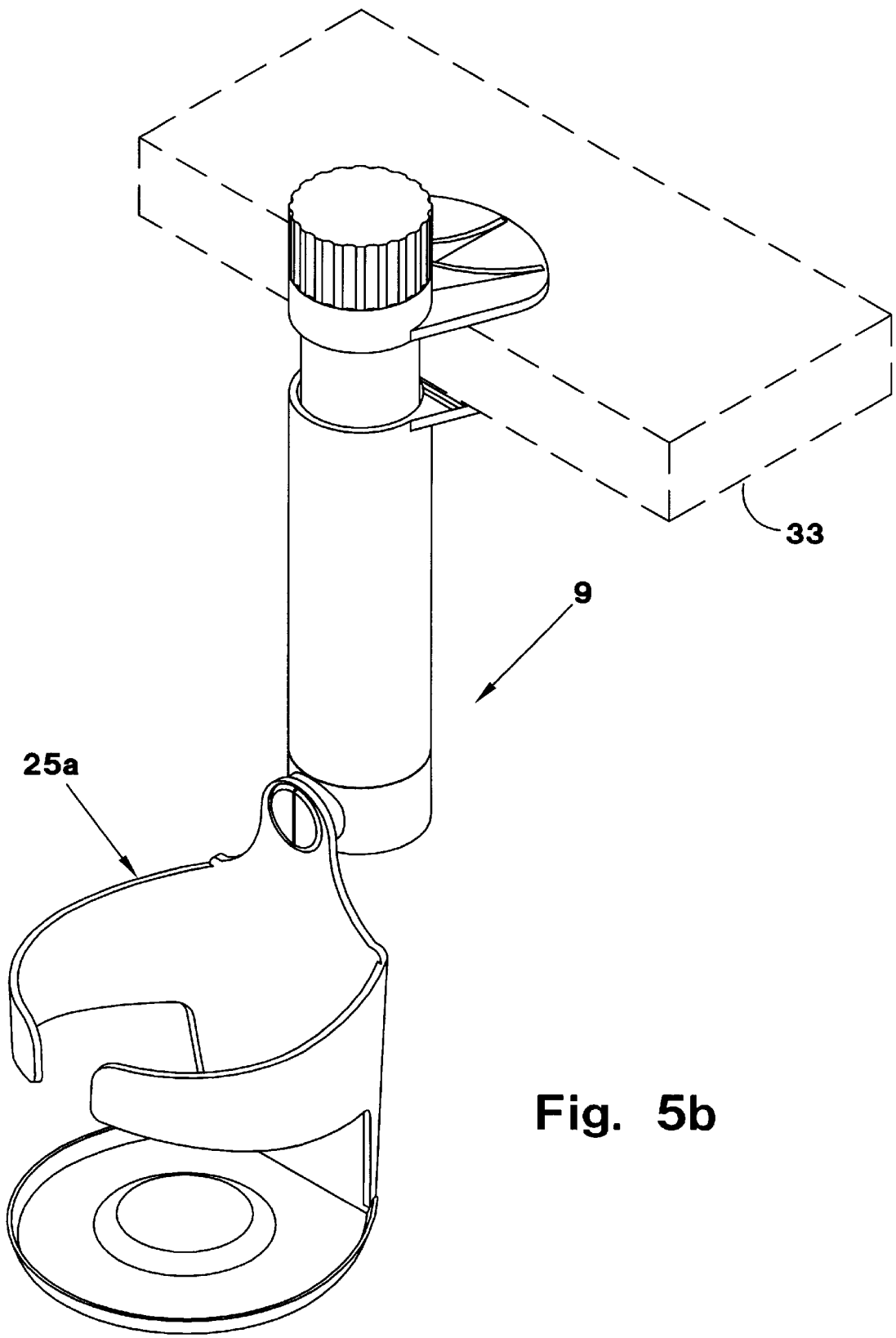
FIG. 5b shows a perspective view of the product clamped on a surface of average thickness in an inverted clamping position.
Figure 5C:
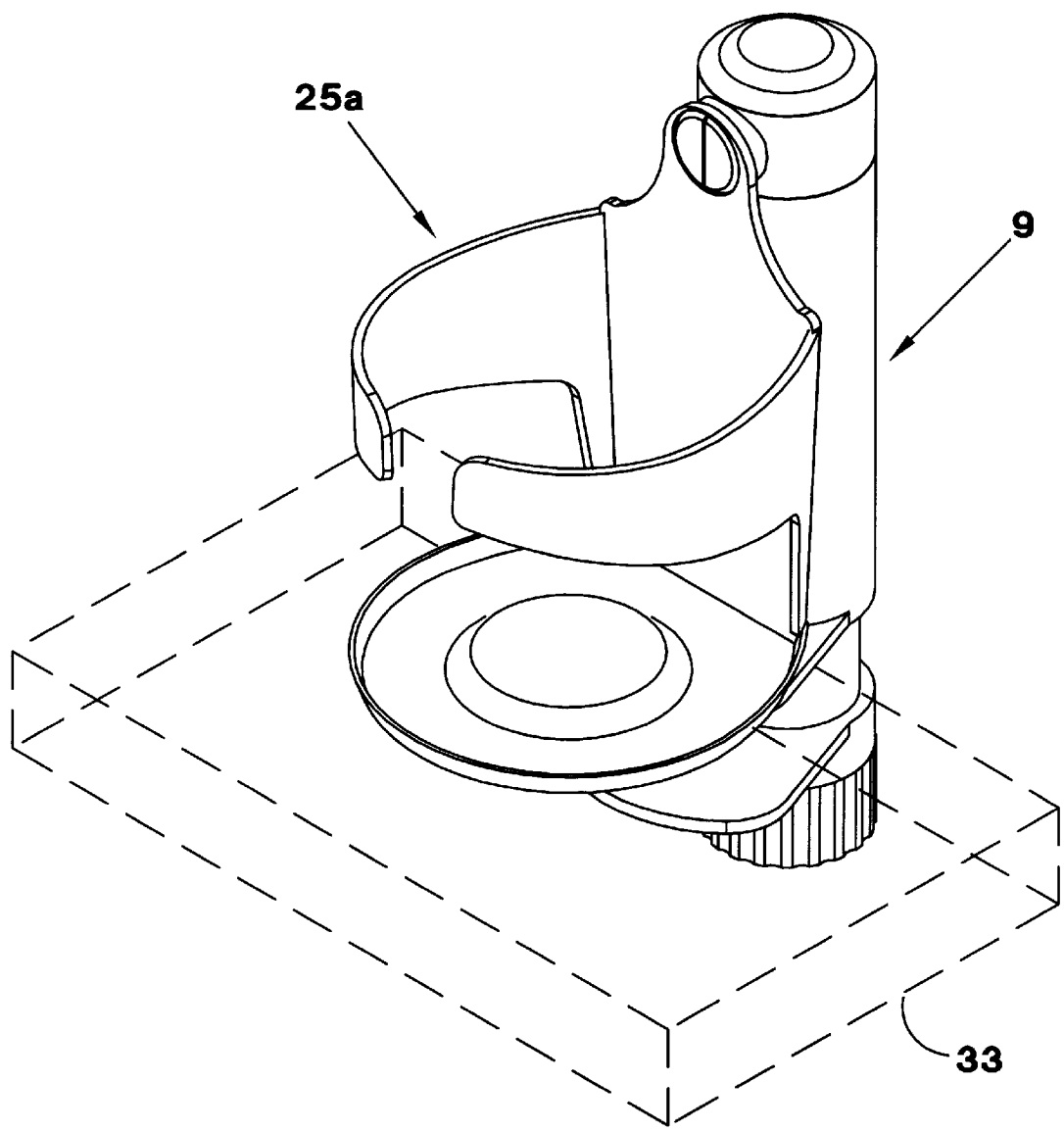
FIG. 5c shows a perspective view of the product clamped on a surface of average thickness with the holder aligned with the clamping members.

The secured receptacle holder 9 is then clamped onto a desk, table, shelf, dashboard, pole or other surface of about three inches or less in thickness. Clamping is achieved by aligning the clamping members 20a and 20b and positioning a surface 33 between them while then rotating the compression knob 12 further clockwise. This further rotation jointly causes the lower post 11a to further enter or telescope into the main post 10a in addition to causing the clamping members 20a and 20b to be driven toward one another until they are securely clamped onto the surface 33 as shown by FIGS. 5b and 5c.

There are a multitude of different surface types that this invention can be clamped onto. The secured receptacle holder 9 can mount to either a level surface as shown by FIG. 5b and 5c or an inclined surface 32 as shown by FIG. 5a. Once mounted the holder 25a can then be swiveled into desired position. Clamping is also possible in inverted positions whereby the main clamping member 20a is below and the lower clamping member 20b is above the surface 33 as shown by FIG. 5b. Still additional surfaces can be accommodated by supporting the secured receptacle holder 9 by a pedestal 31 as shown in FIG. 8.

After clamping is achieved the holder 25a can be placed in a level or alternately desired position by unlocking the support lock 24 which is threaded through the holder hole 25c. Once unlocked the holder 25a can use gravity or other means to be swiveled into desired position. The support lock 24 can be unlocked by placing a twenty five cent piece, a screwdriver, or other common object into its locking groove 30 as shown in FIG. 2, and turning it counter clockwise one quarter turn, about 90 degrees. This action causes the support lock 24 to rotate within the stabilizer housing 15, thread through the thread insert 23 and move away from the main post top 10c that it is engaged against to achieve a locked position. This action also allows enough space to exits between the support lock 24 and the stabilizer housing 15 for the holder 25a to freely swivel. Once the support lock 24 is in an unlocked position the holder 25a can also then be rotated 360° degrees around the longitudinal axis of the main post 10a by rotating the support rotator 14 which is held in place around the main post top 10c by the securing cap 16. The holder 25a can be aligned or angled with the clamping members 20a and 20b as shown in FIG. 5c, aligned or angled on their opposite side as shown in FIG. 5a or anywhere in between. The holder 25a can also be left in place using gravity or can be secured in place by returning the support lock 24 to the locked position. Locking is achieved by turning the support lock 24, using a quarter or other object inserted into the locking groove 30, clockwise one quarter turn causing the support lock 24 to rotate within the stabilizer housing 15, thread through the thread insert 23 and engage itself against the main post top 10c, while simultaneously sandwiching the holder 25a into a locked position.

Once clamped and placed in desired position the holder 25a is ready to support the user's receptacle, beverage container, coffee cup or other object. The receptacle is lowered between the arms 26a and 26b and down upon the base support 27. The receptacle is supported above the clamped surface allowing for only a small amount of surface space to be used. Depending on the diameter of receptacle bottom or on its design, such as an incurvate like shape, the receptacle will either rest directly on the base support 27 or on the raiser 28. In the case where the receptacle has a protrusion or handle such as a coffee mug, the receptacle can be lowered in place with the handle positioned between the arms 26a and 26b allowing for easy placement and retrieval. In the event that the receptacle drips or is cold and experiences "sweating" the moisture will drain downward and rest upon the outward portion of the base support 27 and between the raiser 28 and the base lip 29.

RAMIFICATIONS AND SCOPE

The secured receptacle holder is a highly reliable, easy to use, yet economical device that can be used by persons of almost any age and in almost any profession. Advantages include a quick and easy manner for attaching and detaching to a surface, a secure and slip-resistant method of clamping to any surface, clamping within limited amounts of space and on varying surface locations, clamping to level as well as inclined surfaces, 360° degree rotation allowing holder to face in any direction, a means for clamping that protects surface from damage, clamping onto a multitude of different surface types, a method of securing a holder on surfaces of varying widths, use of strong and durable materials in compact amounts, support for receptacles of varying weight, size and shape, clamping in inverted positions while holding a receptacle level, a holder that protects a surface from wet areas due to "sweating", a holder for varying types of environments such as home, office or travel, a holder that is easy to assemble and disassemble, a holder that is attractive for use in a multitude of environments, and a pedestal support for use on alternate types of surfaces.

While the description above contains many specificities, these should not be construed as limitations on the scope of the invention, but rather as examples of several preferred embodiments. Many other variations are possible such as a larger or smaller size, multiple holders, different types of materials used in manufacturing, made integrally or in other types of connected sections, different colors, different means of clamping such as a screw applying direct pressure onto a surface similar to a C-clamp, different shapes, larger or smaller clamping width, supporting of objects other than receptacles, and alternate types of usage such as clamping small security camera or other device, etc.

Accordingly, the scope of the invention should be determined not by the embodiments illustrated, but by the appended claims and their legal equivalents.

I claim:

1. A holder for supporting a receptacle clear of a surface comprising:
    a. a support means for holding said receptacle;
    b. a post means, having a longitudinal plane and a transverse plane and a length greater than said support means, for carrying said support means;
    c. a positioning means, attached to said post means, for positioning said support means on said surface;
    d. a horizontal swiveling and vertical pivoting means for connecting said support means to said positioning means and for allowing said support means to swivel in said longitudinal plane and pivot in said transverse plane; and
    e. a locking means for allowing and preventing swiveling and pivoting by said horizontal swiveling and vertical pivoting means.

2. A holder as claimed in claim 1 in which said positioning means is a pedestal.

3. A holder as claimed in claim 1 in which said surface is accessible from two sides and said positioning means is a clamp.

4. A holder as claimed in claim 1 in which said support means comprises a leg having a top and a bottom, a base attached at right angles to said leg at said bottom and an encircling arm attached at right angles to said leg, in the same direction as said base, between said top and said bottom; said leg being smaller than said post means.

5. A holder as claimed in claim 1 in which said support means further comprises a liquid retaining means for preventing liquids from dripping from said support means.

6. A holder for supporting a receptacle clear of a surface comprising:
   a. a main post having a top, a bottom and a longitudinal axis;
   b. a rotator ring, having a circumference and a threaded hole through said circumference, swivelably attached around said main post near said top;
   c. a screw screwed into said threaded hole;
   d. a receptacle holder including a leg having a top and a bottom, a base attached at right angles to said leg at said bottom and an encircling arm attached at right angles to said leg, in the same direction as said base, between said top and said bottom; said leg having a length less than that of said main post, and an attachment hole near its top; said leg being pivotally attached via said attachment hole to said circumference by said screw; and
   e. means for positioning said main post on said surface, attached to said bottom of said main post;
   whereby loosening said screw allows free rotation of said rotator ring around said main post and pivoting of said receptacle holder around said screw, and tightening said screw locks said receptacle holder in a desired position in relation to said main post and said surface.

7. A holder as claimed in claim 6 in which said means for positioning is a pedestal.

8. A holder as claimed in claim 6 in which said surface is accessible from two sides and said means for positioning is a clamp.

9. A holder as claimed in claim 8 in which said main post is hollow, the mechanism of said clamp telescopes inside said main post and said clamp is adjusted via an external knob.

10. A holder as claimed in claim 8 in which said base further comprises a liquid retaining means for preventing liquids from dripping from said receptacle holder.

11. A holder as claimed in claim 6 in which said receptacle holder further comprises a receptacle raising means, attached approximately centrally to said base, whereby liquids forming on the outside of said receptacle are preventing from dripping from said receptacle holder.

12. A holder for supporting a receptacle clear of a surface comprising;
   a. a support means for holding said receptacle;
   b. a post means, having a longitudinal plane and a length greater than said support means, for carrying said support means; said post means further comprises a transverse plane and said holder further comprises a vertical pivoting means for allowing said support means to pivot in said transverse plane;
   c. a positioning means, attached to said post means, for positioning said support means on said surface; and
   d. a horizontal swiveling means for connecting said support means to said positioning means and for allowing said support means to swivel in said longitudinal plane.

13. A holder as claimed in claim 12 in which said holder further comprises a locking means for allowing and preventing swiveling by aid horizontal swiveling means and pivoting by said vertical pivoting means.

14. A holder as claimed in claim 13 in which said support means comprises a leg having a top and a bottom, a base attached at right angles to said leg at said bottom and an encircling arm attached at right angles to said leg, in the same direction as said base, between said top and said bottom; said leg being smaller than said post means.

15. A holder as claimed in claim 14 which said surface is accessible from two sides and said positioning means is a clamp.

16. A method for supporting a receptacle clear of a surface comprising the steps of:
   a. providing a main post having a top, a bottom and a longitudinal axis;
   b. providing a rotator ring, having a threaded hole through its circumference;
   c. swivelably attaching said rotator ring around said main post near said top;
   d. providing a receptacle holder including a leg having a top and a bottom, a base attached at right angles to said leg at said bottom and an encircling arm attached at right angles to said leg, in the same direction as said base, between said top and said bottom; said leg having a length less than that of said main post, and an attachment hole near its top;
   e. providing a screw;
   f. pivotally attaching said receptacle holder to said circumference by screwing said screw through said attachment hole and said threaded hole;
   g. providing means for positioning said main post on said surface; and
   h. attaching said means for positioning to said bottom of said main post;
   whereby loosening said screw allows free rotation of said rotator ring around said main post and pivoting of said receptacle holder around said screw, and tightening said screw locks said receptacle holder in a desired position in relation to said main post and said surface.

17. A method as claimed in claim 16 further comprising the steps of:
   a. providing a means for raising said receptacle; and
   b. attaching said means for raising to said base;
   whereby liquids forming on the outside of said receptacle are preventing from dripping from said receptacle holder.

18. A support for holding a receptacle, comprising:
   a support post having a first end and a second end, said support post extending generally about a longitudinal axis;
   a base attached to said first end of said support post, said base configured to support said support post;
   a holder pivotably attached to said second end of said support post, said holder including a single holder leg, a base support connected to said holder leg, and one or more holder arms attached to said holder leg;
   wherein said holder is configured to be placed in a desired position relative to said support post.

19. A support as in claim 18, wherein said base comprises a clamp.

20. A support as in claim 19, wherein said clamp is adjustable so that the support can be attached to objects of different thicknesses.

21. A support as in claim 18, wherein said base comprises a second post telescopingly inserted into said support post, said support post and said second post each having a radially outward extending flange configured to form a clamp.

22. A support as in claim 21, further comprising a clamping screw which connects said second post to said support post.

23. A support as in claim 22, wherein said clamping screw selectively locks said second post in a desired position relative to said support post.

24. A support as in claim 18, wherein said base comprises a pedestal.

25. A support as in claim 18, further comprising a lip attached to said base support to help prevent liquids from dripping from said base support.

26. A support as in claim 25, further comprising a raiser attached to said base support, said raiser and said lip spaced apart to form a channel.

27. A support as in claim 18, further comprising a connector which pivotably attaches said holder to said support post about an axis generally transverse to said longitudinal axis of said support post.

28. A support as in claim 27, wherein said connector further includes a first position which locks said holder in a desired position and a second position which allows pivoting of said holder about said connector.

29. A support as in claim 18, wherein said holder is rotatably attached to said support post about said longitudinal axis of said support post.

30. A support as in claim 18, further comprising a securing cap connecting said holder to said support post.

31. A support as in claim 30, wherein said securing cap is rotatably attached about said longitudinal axis of said support post.

32. A support as in claim 30, wherein said securing cap is selectively locked into a desired position.

33. A support as in claim 30, wherein said holder is pivotably attached to said securing cap about an axis generally transverse to said longitudinal axis of said support post by a connector.

34. A support as in claim 18, wherein said support post has a length greater than a length of said holder leg.

* * * * *

UNITED STATES PATENT AND TRADEMARK OFFICE
CERTIFICATE OF CORRECTION

PATENT NO. : 5,842,671

DATED : December 1, 1998

INVENTOR(S): Dorian Gibbs

It is certified that error appears in the above-identified patent and that said Letters Patent is hereby shown below:

In Claim 13, column 8, line 7 please replace "by aid" with --by said--
In Claim 15 column 8, line 15 please replace "14 which" with --14 in which--

Signed and Sealed

Sixth Day of March,

Attest:

NICHOLAS P. GODICI

*Attesting Officer*   Acting Director of the United States Patent an